Sept. 26, 1944.  J. J. N. VAN HAMERSVELD  2,359,064
MACHINE TOOL
Filed Oct. 23, 1940  6 Sheets-Sheet 1
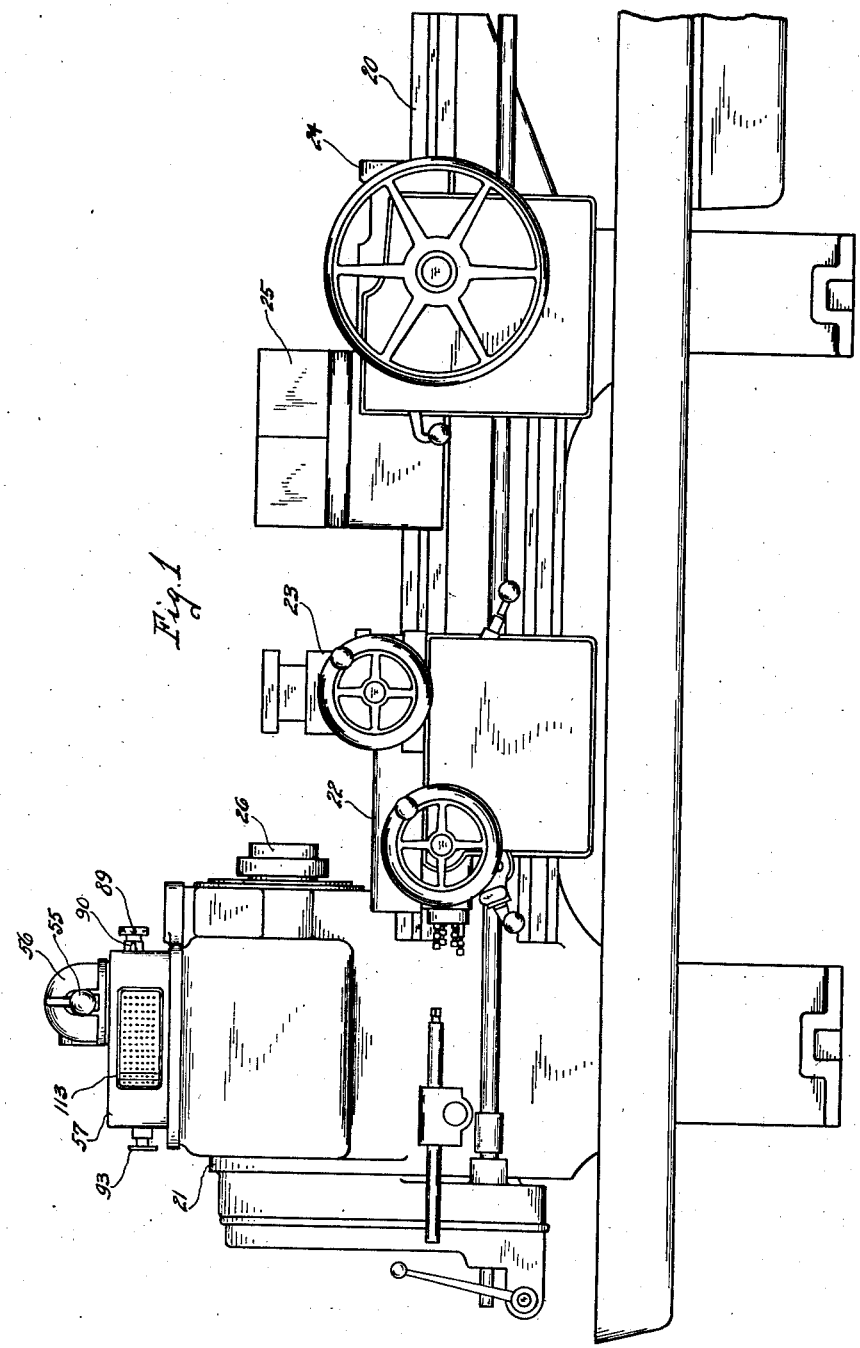
INVENTOR.
JOHN J. N. VAN HAMERSVELD
BY
Kwis Hudson & Kent
ATTORNEYS Sept. 26, 1944. J. J. N. VAN HAMERSVELD 2,359,064
MACHINE TOOL
Filed Oct. 23, 1940 6 Sheets-Sheet 2
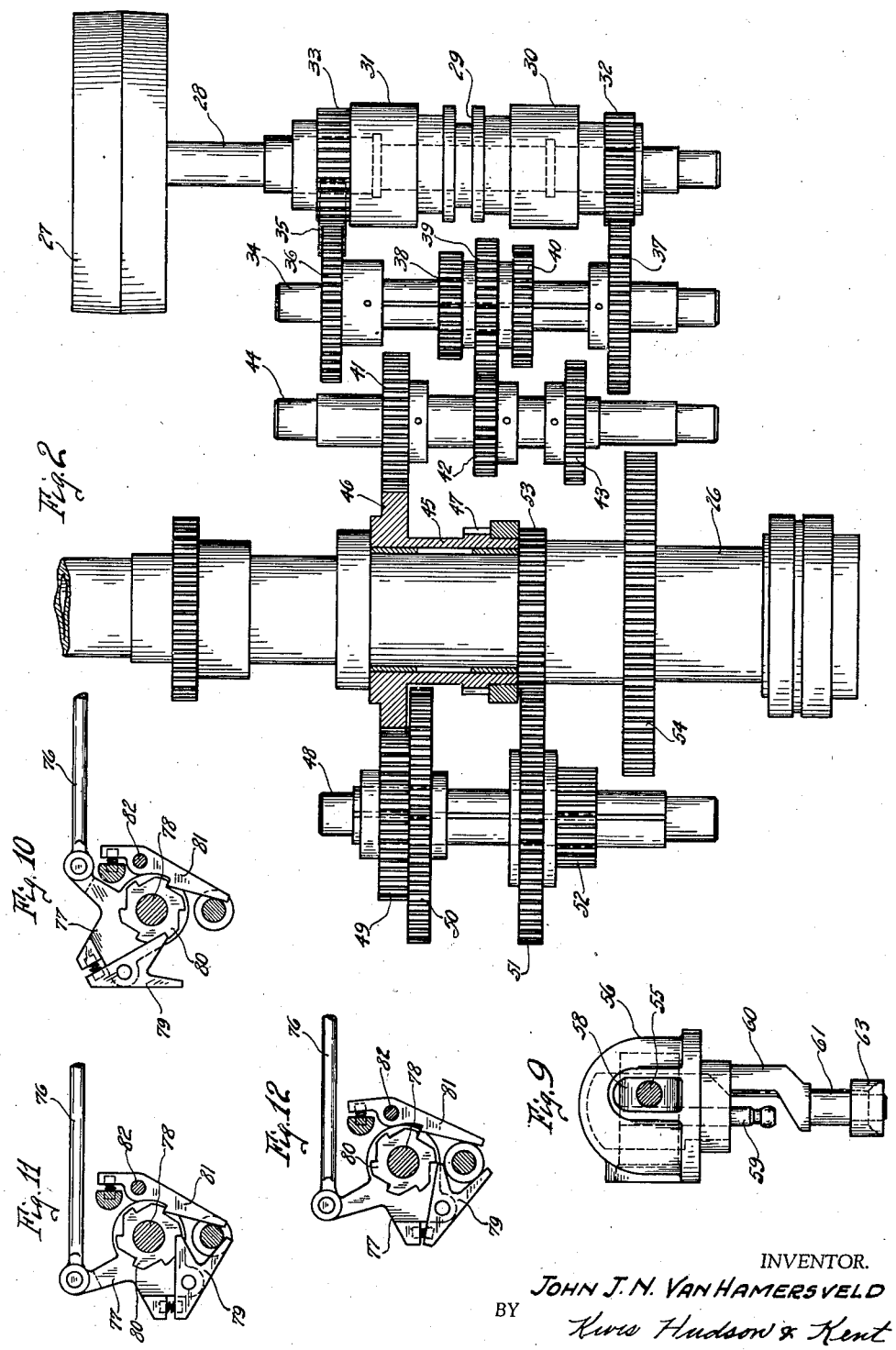
INVENTOR.
JOHN J. N. VAN HAMERSVELD
BY
Kwis Hudson & Kent
ATTORNEYS Sept. 26, 1944.   J. J. N. VAN HAMERSVELD   2,359,064
MACHINE TOOL
Filed Oct. 23, 1940   6 Sheets-Sheet 3
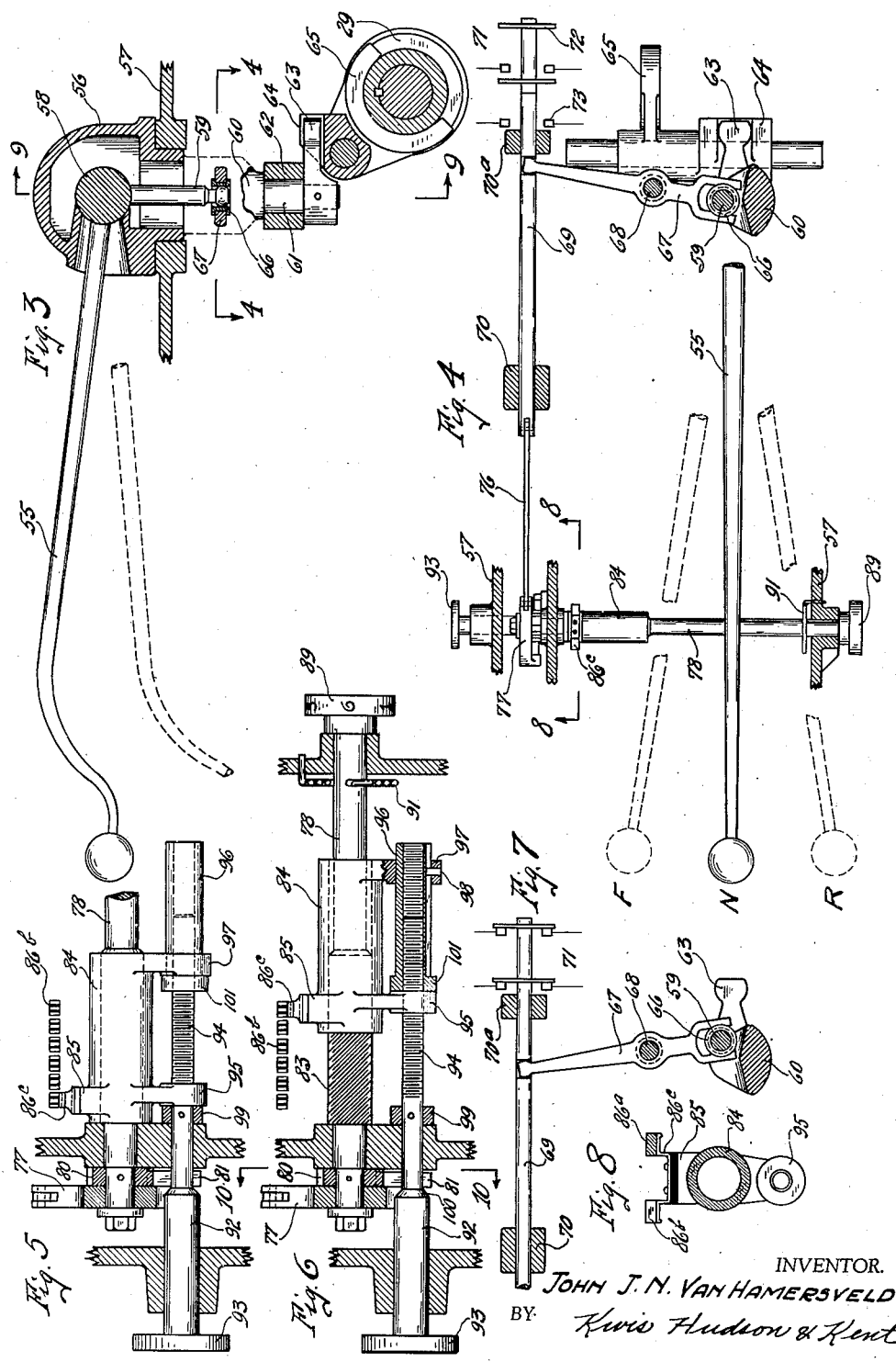
INVENTOR.
JOHN J. N. VAN HAMERSVELD
BY Kwis Hudson & Kent
ATTORNEYS

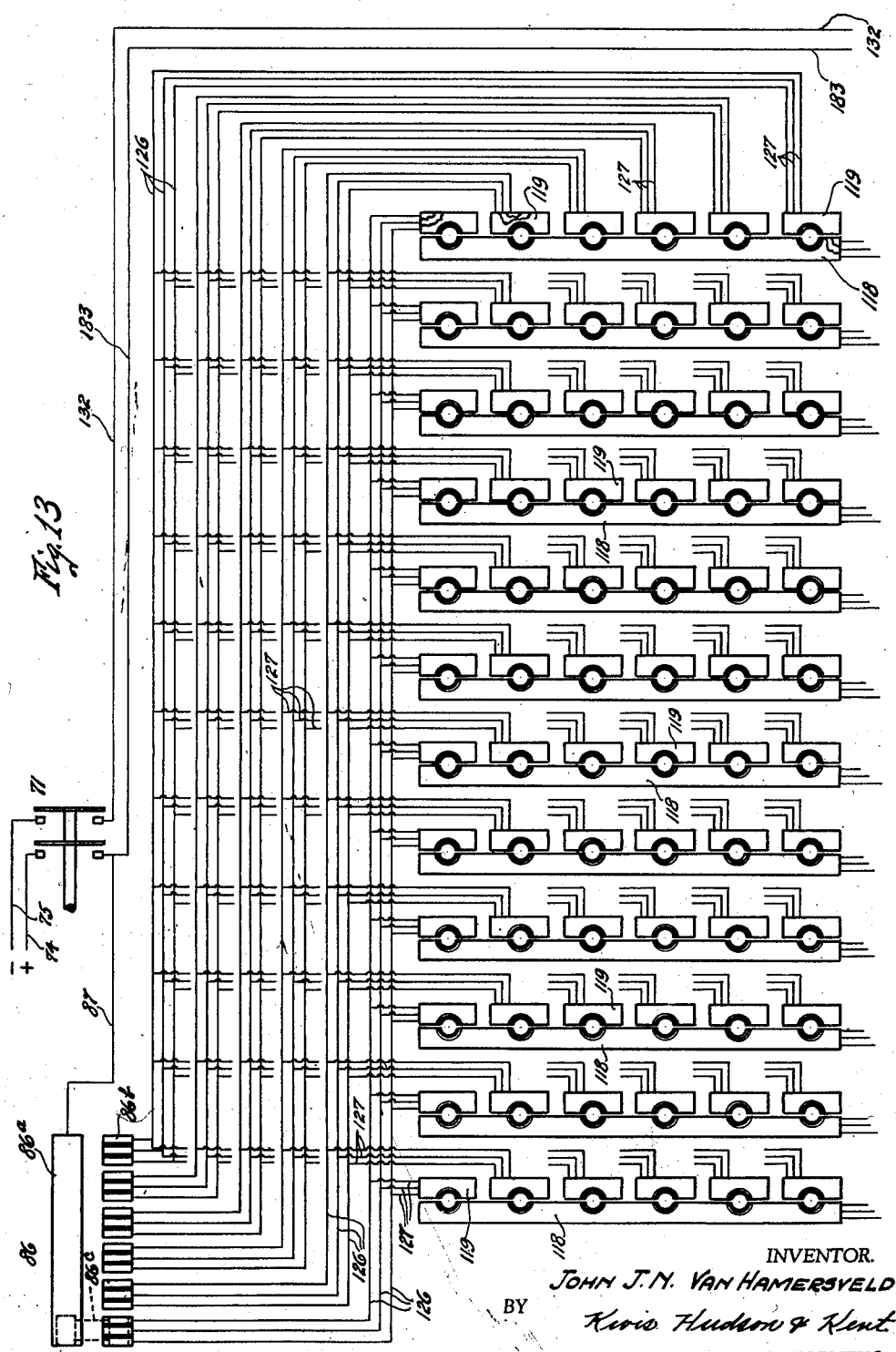

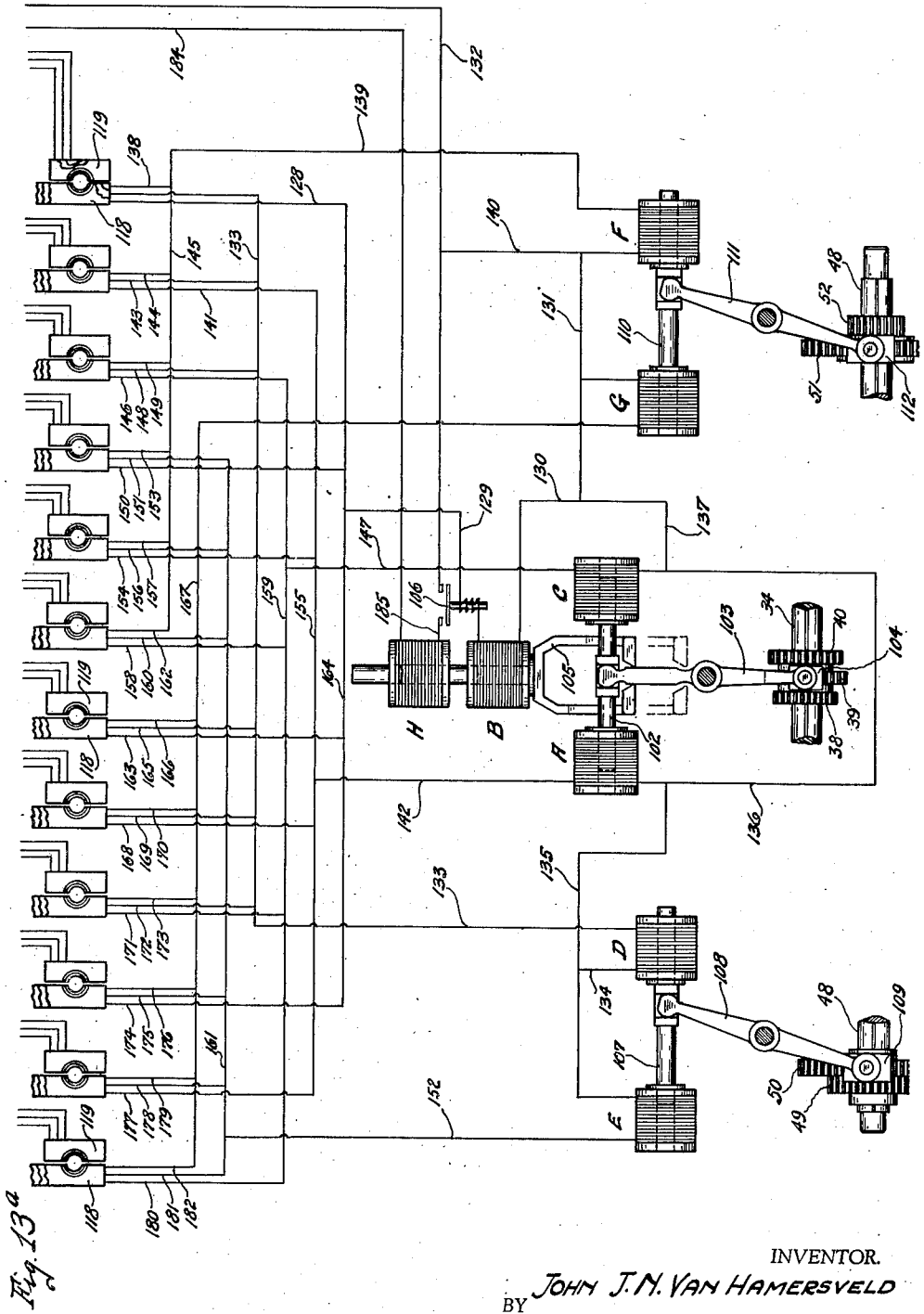

Sept. 26, 1944. J. J. N. VAN HAMERSVELD 2,359,064
MACHINE TOOL
Filed Oct. 23, 1940 6 Sheets-Sheet 6
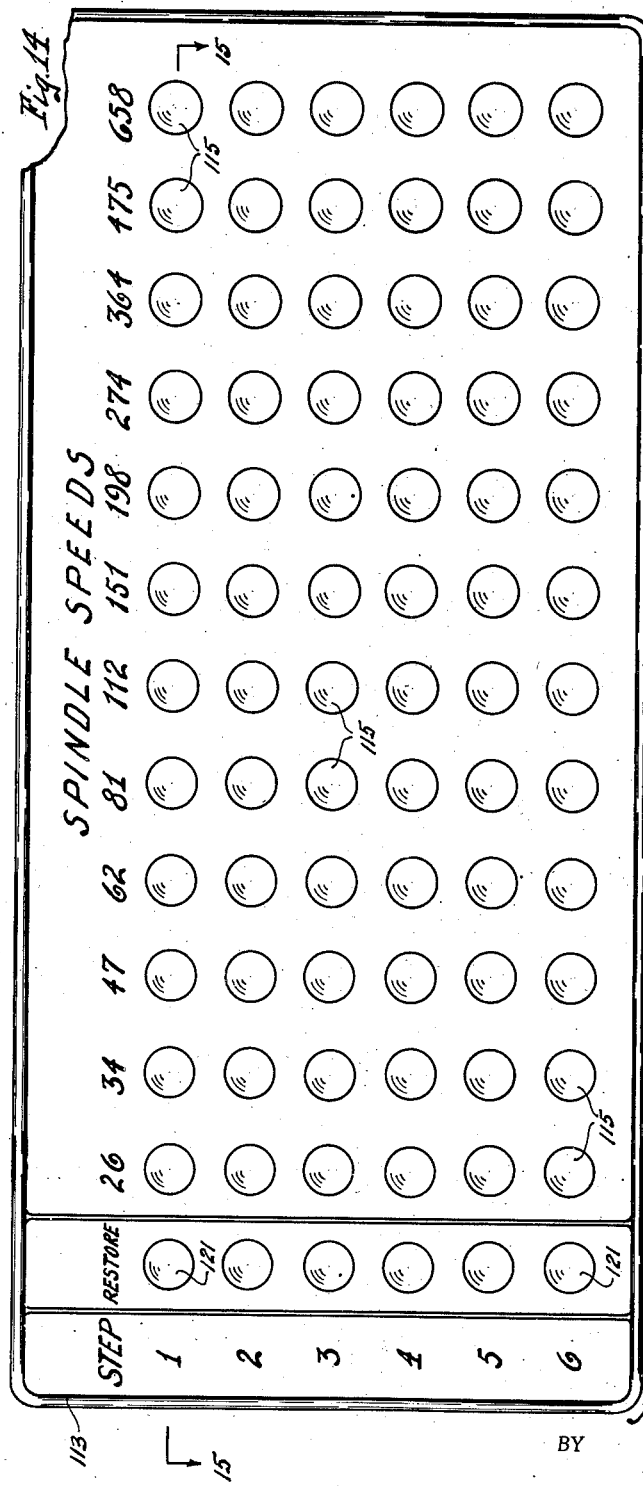
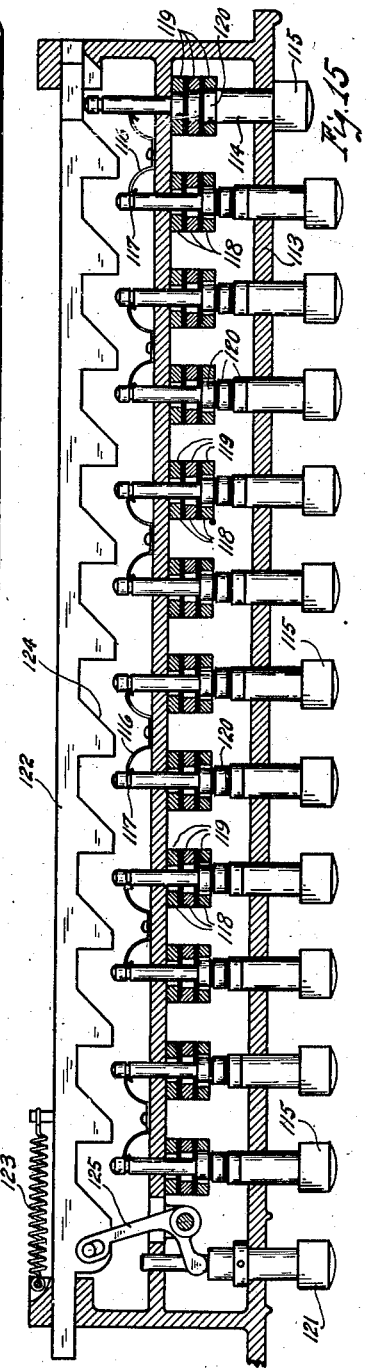
INVENTOR.
JOHN J. N. VAN HAMERSVELD
BY
Kwis Hudson & Kent
ATTORNEYS Patented Sept. 26, 1944

2,359,064

UNITED STATES PATENT OFFICE 2,359,064

MACHINE TOOL

John J. N. Van Hamersveld, Cleveland Heights, Ohio, assignor to The Warner & Swasey Company, Cleveland, Ohio, a corporation of Ohio Application October 23, 1940, Serial No. 362,421

15 Claims. (Cl. 82—29)

This invention relates to machine tools and particularly to an improved form of selecting or preselecting mechanism by which the rates of movement of a part of the machine tool which is adapted to be operated at different rates may be selected or preselected for all the different steps of a work cycle.

The principal object of the present invention is to accomplish the selection or preselection by electrical means instead of by mechanical means as has been proposed heretofore.

A further and more specific object is to simplify the selecting or preselecting mechanism for the movable part of the machine tool and to facilitate the selection or preselection by simplifying the parts which are to be manually actuated by the operator for that purpose.

Another object is to obtain the selection or preselection of the rates of movement of the movable part of the machine tool for all the steps in a work cycle by employing a primary switch and a secondary step-by-step movable switch which are both controlled by the movement of a single control member in combination with series of manually settable switches one series for each step in the work cycle.

A still further object is to obtain the selection or preselection of the rates of movement of the movable part for all the different steps of a work cycle simply by the actuation of a series of switches which for convenience and to obtain a compact arrangement may be in the form of a group of push button switches conveniently and compactly arranged on a readily accessible part of the machine tool.

The invention in its preferred form includes a series of electric motive devices, such as solenoids, for actuating or controlling the actuation of shiftable elements of the transmission by which a part of the machine is adapted to be operated at different rates of movement for the different steps of the work cycle, which part may be the work spindle, the cross-slide, the cross-slide carriage, or the turret saddle. Additionally, the invention preferably includes switching means including groups of manually operated switch elements employed for the purpose of preselecting, together with a step-by-step movable switch mechanism including one or more parts which are actuated by the control lever.

The manually operated switch elements are preferably arranged on a panel grouped in accordance with different rates of movement of the movable part and in accordance with the different operating steps of the work cycle, which groupings make it possible to bring about the energization of the electric motive devices in various combinations to obtain different rates of movement of the movable part for the different operating steps of the work cycle.

The invention may be further briefly summarized as consisting in certain novel combinations and arrangements of parts which will be described in the specification and set forth in the appended claims.

In the accompanying drawings I have illustrated the invention, by way of example only, applied to the work spindle of a machine tool, and in the embodiment illustrated provision is made for imparting twelve different rates of movement to the movable part for a work cycle composed of six operating steps.

In the drawings,

Fig. 1 is a side elevation of a machine tool here illustrated as a turret lathe;

Fig. 2 is a diagrammatic view of the transmission employed in the head for giving the spindle the desired rates of movement;

Fig. 3 is a fragmentary vertical sectional view illustrating particularly the control lever and the clutch operating mechanism;

Fig. 4 is a horizontal sectional view taken substantially along the line 4—4 of Fig. 3 with a portion of the lever which is above the section line also shown for the sake of clearness;

Fig. 5 is a vertical sectional view showing part of the mechanism illustrated in Fig. 4;

Fig. 6 is a view of the mechanism illustrated in Fig. 5 with certain of the parts in different positions than in Fig. 5 and with some additional parts;

Fig. 7 is a view illustrating some of the parts of Fig. 4 but in different positions;

Fig. 8 is a vertical sectional view substantially along the line 8—8 of Fig. 4 on an enlarged scale;

Fig. 9 is a vertical sectional view substantially along the line 9—9 of Fig. 3;

Fig. 10 is a vertical sectional view substantially along the line 10—10 of Fig. 6;

Figs. 11 and 12 are similar views showing the parts in different positions;

Figs. 13 and 13a (the latter being a continuation of Fig. 13) constitute a diagrammatic view of the switch mechanism, the electric motive devices, and the circuit connections between the same;

Fig. 14 is a view of the switch panel for the manually operated switches indicated diagrammatically in Figs. 13 and 13a; and Fig. 15 is a horizontal sectional view substantially along the line 15—15 of Fig. 14.

Referring now to the drawings, in Fig. 1 I have shown my invention applied to a turret lathe, but, of course, it will have utility in many other different types of machine tools. Furthermore, while I have shown my invention applied to the work spindle of a lathe, it may, as before stated, be applied to other parts which are to be actuated at different rates, as, for example, the cross-slide carriage, the cross-slide, and the turret saddle.

Accordingly, the term "movable part of a machine tool" as used herein will apply to any movable part which is to be driven or moved at varying rates of speed or feed, such as those above mentioned or comparable parts of any machine tool in connection with which the invention finds utility.

The lathe illustrated in Fig. 1 has a bed 20, a headstock 21, a cross-slide carriage 22 having a transversely movable cross-slide 23, and a turret saddle 24 carrying a turret 25. The work spindle 26 which is supported by the headstock 21 is adapted to be driven at varying speeds by a transmission to which power may be applied in any suitable manner, but in this instance by means of a belt pulley 27 secured to a shaft 28. This shaft is provided with a shiftable clutch member 29 which is splined to the shaft and arranged on opposite sides of this clutch member are suitable cooperating clutch members 30 and 31 which are freely rotatable on shaft 28 and which, together with the clutch member 29, constitute friction clutches, either part 30 or part 31 being adapted to be frictionally engaged with or otherwise clutched to the clutch member 29 for either forward or reverse rotation in the well known manner.

The clutch member 30 has fixed to it a gear 32 for forward rotation of the spindle, and the clutch member 31 has fixed to it a gear 33 for reverse rotation of the spindle. Power is transmitted from shaft 28 to shaft 34 of the transmission through the medium of an idler gear 35 which engages the gear 33 and also a gear 36 which is fixed to shaft 34. Through the gears 33, 35, and 36 the shaft 34 will be rotated in the reverse direction. Forward rotation is transmitted from shaft 28 to shaft 34 from gear 32 to a gear 37 fixed to shaft 34.

Shiftable along the shaft 34 and splined thereto and arranged between the gears 36 and 37 is a three-step gear cone consisting of gears 38, 39, and 40 which are adapted to engage, respectively, gears 41, 42, and 43 fixed to a shaft 44 of the transmission. By shifting the gear cone composed of gears 38, 39, and 40 to its three different positions on shaft 34, shaft 44 can be driven at three different rates either in forward or reverse. Rotation is transmitted from shaft 44 to a sleeve 45 which turns loosely on the work spindle 26 by the engagement of gear 41 on shaft 44 with a gear 46 carried by sleeve 45. The sleeve 45 also has a second gear 47.

Rotation is transmitted from the sleeve 45 to a shaft 48 of the transmission which shaft has a rear two-step gear cone composed of gears 49 and 50 and a front two-step gear cone composed of the gears 51 and 52, both gear cones being splined to the shaft. The gear 46 is adapted to mesh with gear 49 when the two-step gear cone is in one position, and gear 47 is adapted to mesh with gear 50 when the gear cone is in the other position. The gear 51 of the forward two-step gear cone is adapted to mesh with gear 53 secured to the work spindle 26 and the gear 52 of this gear cone is adapted to mesh with the gear 54 which also is secured to the work spindle 26. Thus by the transmission herein illustrated the spindle can be rotated either in a forward or in a reverse direction at twelve different rates.

The headstock has a single control lever 55 which is adapted for both horizontal and vertical movements, as indicated in Figs. 3 and 4, and is mounted in a housing 56 which is carried by the cover 57 of the headstock (see Fig. 3). There is journaled in the housing 56 a shaft 58 which carries the control lever 55 and also a short downwardly extending lever 59 for a purpose later to be described. When the control lever is moved vertically from the solid line position shown in Fig. 3 to the dotted line position shown in the same figure, the lever 59 is rocked in a vertical plane. When the control lever 55 is swung horizontally from neutral position designated N in Fig. 4 to dotted line position F for forward rotation of the spindle or dotted line position R for reverse rotation, it rocks the housing 56 in the cover 57. The housing 56 has a downwardly extending portion 60 having a bearing portion 61 engaged by a bearing 62 which is supported by the cover 57 (see Figs. 3 and 9). Below the bearing portion 61 there is secured to the lower end of this extension 60 of the housing 56 a short lever 63 which, as clearly shown in Figs. 3, 4, and 7, engages in a groove of a yoke sleeve 64 carrying a yoke 65 which engages in the circular groove of the clutch member 29 which is slidably mounted on shaft 28. Thus by horizontal rocking of the control lever from the full line position N (neutral) to the dotted line position F or R, this clutch member is engaged with either the clutch member 30 or the clutch member 31 for forward or reverse rotation of the work spindle 26 and of course when the control lever is in neutral position the movable clutch member is disengaged from both the clutch members 30 and 31 and the work spindle is then stationary.

The vertical downward movement of the control lever 55 brings about the energization of certain motive devices hereinafter referred to, which devices shift the gear cones for obtaining the desired speed for any particular step of the work cycle. When the control lever is moved downward from the full line position of Fig. 3 to the dotted line position, the short lever 59 is rocked rearwardly from the position shown in Fig. 4 to the position shown in Fig. 7 in both of which figures the ball portion at the lower end of the lever 59 is shown in section. This ball portion of the lever 59 engages in the bore of a double-flanged bushing 66 which engages in the slot or between the arms of a fork at one end of a lever 67 which is mounted for horizontal rocking movement on a bearing pin 68 carried by the cover 57. The other end of the lever 67 engages in a notch in a horizontally movable bar 69 supported for horizontal sliding movement by lugs 70 and 70a on the underside of the cover of the headstock. The bar 69 is moved forwardly when the control lever is moved downwardly to its dotted line position shown in Fig. 3, the bar 69 then being moved from the position shown in Fig. 4 to the position shown in Fig. 7. This movement of the bar performs two functions or steps instrumental in the energization of the motive devices which shift the gear cones. It closes a switch which is in the energizing circuit for the motive devices. This switch, which to distinguish from other switches to be referred to might be termed the main or primary switch and which in Figs. 4, 7, and 13 is designated 71, is here illustrated as a double pole switch consisting of two bridging contact members 72 engaging two pairs of stationary contacts 73 which are arranged in conductors 74 and 75 of the current supply circuit.

The forward movement of the bar 69 not only closes the primary switch 71 but it also, through mechanism shortly to be described, actuates a secondary switch which has a step-by-step movement and is shown conventionally at 86 in Fig. 13. This secondary switch 86 consists of a contact strip 86a, a series of contacts 86b arranged in groups, each group consisting in this instance of three contacts which are insulated from each other, and a bridging contact 86c one end of which engages the contact strip 86a and the other end of which is adapted to engage and electrically connect successively the three contacts 86b of each group as the bridging contact 86c is given its step-by-step movement. The number of groups of contacts 86b will depend upon the number of steps in the work cycle, in this instance six, and the number of contacts 86b in each group will depend upon the number of gear cones or other shiftable devices in the transmission, in this instance three. The contact strip 86a and the groups of contacts 86b will be suitably supported on any convenient part, such as the cover of the headstock. The bridging contact 86c is supported on a movable member to be referred to presently.

It might be here stated that the contact strip 86a of the step-by-step or secondary switch 86 is connected by a conductor 87 to one of the main supply conductors below or beyond the primary switch 71 so that the current supply to the secondary switch 86 will be cut off when the primary switch is open.

Referring again to the bar 69, I will now describe the manner in which the secondary switch 86 is actuated. As will be seen particularly by reference to Figs. 4, 5, 6, 10, 11, and 12, the forward end of the bar 69 is connected by a link 76 to a rockable pawl support 77 which is mounted on one end of a shaft 78 carried by the cover of the headstock or other part attached thereto. This pawl support 77 carries a pawl 79 which is adapted to engage the teeth of a ratchet 80 secured to shaft 78, see particularly Figs. 10, 11, and 12. When the control lever 55 is moved downwardly from the full line position to the dotted line position shown in Fig. 3, the pawl support and the pawl as well as the link 76 are moved from the position shown in Fig. 10 to the position shown in Fig. 11, and when the control lever is moved back again to the full line position of Fig. 3, these parts are again restored to the position shown in Fig. 10.

A holding pawl 81 also engages the teeth of the ratchet 80 in the manner illustrated in Figs. 10, 11, and 12 and serves to prevent reverse rotation of the ratchet 80 when the pawl is being moved from the position of Fig. 11 back to the position of Fig. 10. The holding pawl 81 which normally has its active end spring-pressed toward the ratchet is mounted on a pin 82 which can be carried by the cover. A step-by-step movement is thus imparted to the ratchet 80 and to the shaft 78, one step for each step of the work cycle of the machine tool.

The shaft 78, as best shown in Fig. 6, has a steep threaded portion 83 which is engaged by a nut in the form of a sleeve 84 having a laterally projecting arm 85 (Figs. 5 and 6) which carries the bridging switch contact 86c of the secondary switch 86, said switch contact extending alongside the groups of contacts 86b and contacting the bar 86a. The contacts 86b and the contact bar 86a are supported in the manner hereinafter referred to.

Each step-by-step movement imparted to the ratchet 80 by the downward movement of the control lever will impart the necessary rotation to the shaft 78 so that the threaded portion 83 thereof by its engagement with the nut 84 will impart sufficient endwise movement to the sleeve or nut 84 to shift the switch contact 86c from one set of contacts 86b to the next set of these contacts. In this instance, as shown in Figs. 10, 11, and 12, the ratchet has six teeth, and, as shown in Figs. 5 and 6, there are six sets of contacts 86b in the group. These six sets of contacts will function for a work cycle of six steps, as will appear subsequently.

When the ratchet has been given six successive step-by-step movements adapted for a work cycle of six steps, the switch contact 86c carried by the sleeve or nut 84 will have been moved from the position shown in Fig. 5 to the position shown in Fig. 6, in other words, from a position to engage the first set of contacts 86b to a position to engage the last set of these contacts.

Carried by one end of the shaft 78 is a dial 89 having equally spaced numerals on its periphery corresponding to the number of steps of the work cycle, and associated with this dial but mounted on a stationary part of the cover is a pointer 90 which, by cooperation with a particular numeral in line with it, will always give a visual indication of the particular step of the work cycle then being carried out or about to be carried out (see Fig. 1).

It will be noted by reference to Fig. 6 that there is provided a rat trap spring 91 one end of which is supported by the cover of the headstock and the other end of which is connected to the shaft 78. This spring is wound up during the step-by-step movements imparted to the shaft 78 and to the switch contact 86c as the various steps of the work cycle are followed through. It might be here stated that the function of this spring 91 is to rotate the shaft 78 in the reverse direction so as to restore the parts from the position shown in Fig. 6 to the position shown in Fig. 5 when the work cycle has been completed.

To accomplish this result, there is arranged below the shaft 78 and preferably supported also by the cover a rod 92 having a knob 93 exposed outside of the cover of the headstock and accessible to the operator. Its location is seen at the upper lefthand end of Fig. 1. This rod has a threaded portion 94 which extends loosely through a lug 95 integral with the sleeve or nut 84 and beyond the lug 95 the threaded portion 94 of the rod extends into an internally threaded sleeve 96 which is partly supported by the rod and partly by a second lug 97 integral with the sleeve or nut 84. The sleeve 96 has a keyway in which is engaged a pin 98 carried by the second lug 97 of the sleeve or nut 84. This pin holds the sleeve 96 against rotation, but the sleeve is free to slide in the bore of the lug 97. There is secured to the rod 92 a collar 99 which normally engages the inner face of the wall of the cover, as illustrated in Figs. 5 and 6, and the rod further has a conically shaped camming portion 100 which normally lies just forwardly or outwardly of the lower ends of the two pawls 79 and 81 which normally engage the ratchet, as illustrated in Figs. 10 and 11. One end of the sleeve 96 is provided with a shouldered portion 101 which, when the last step of the work cycle has been completed, is engaged by the lug 95 of the sleeve or nut 84. The sleeve 96 will be set or adjusted to a given position, depending upon the number of steps in the work cycle, by turning the knob 93, and when the last step of the cycle is initiated, the lug 95 will be brought up against the shoulder 101 of the sleeve 96 as illustrated in Fig. 6. Initially, i. e., when the first step is initiated, the lug 95 will be located away from the shoulder 101 a distance equivalent to the distance of travel of the switch contact 86c over the groups of contacts 86b. In this instance, the sleeve 96 has been set for a work cycle of six steps since in Fig. 6 the switch contact 86c is engaging the last set of contacts 86b and the lug 95 is up against the shoulder 101.

The work cycle now having been completed, the parts are to be restored to their previous positions, and this is accomplished by the operator giving the control lever an additional usual downward movement as though the step-by-step switch contact 86c were to be moved for a seventh or additional step of the cycle. This downward movement of the control lever has the effect of again turning the threaded portion 83 of the shaft 78, and this moves forward the sleeve 84 the only effect of this additional forward movement of the sleeve being to cause an inward movement of the rod 92 by reason of the engagement of the lug 95 with the shoulder 101 on the sleeve or nut 96. This movement causes the cam portion 100 of the rod 92 to spread the lower ends of the pawls 79 and 81 so as to bring the pawls out of engagement with the ratchet 80, as shown in Fig. 12, and as soon as this occurs the rat trap spring 91 rotates the shaft 78 in the reverse direction to which it was previously turned when given the step-by-step movements, and the effect of this is to quickly restore the sleeve 84 with its step-by-step switch contact 86c to its original position shown in Fig. 5. During the latter part of this return movement of the sleeve 84 the lug 95 will engage the collar 99 on rod 92 and move it outwardly up against the wall of the cover, as in Figs. 5 and 6, so as to disengage the cam portion 100 from the lower ends of the pawls and thus allow them to move inwardly in contact with the ratchet 80. The parts are now in position for a repetition of the steps of the work cycle of the machine tool.

It was previously stated that the gear cones are shifted or the movement thereof is controlled by electric motive devices which are preferably in the form of solenoids, and that form of motive device is illustrated in Fig. 13a. In a transmission employing three gear cones which are shifted to provide the necessary rates of movement by solenoids, I prefer to employ eight solenoids arranged as illustrated in Fig. 13a.

For shifting the three-step gear cone I utilize three solenoids A, B, and C, as well as an auxiliary solenoid H. For shifting the rear two-step gear cone I employ solenoids designated E and D, and for shifting the front two-step gear cone I employ the solenoids F and G. With a transmission such as illustrated in Fig. 2, utilizing one three-step gear cone and two two-step gear cones, naturally the three-step gear cone has three operating positions. The two solenoids A and C are employed in this instance to move the three-step gear cone to its extreme righthand and lefthand positions through the medium of a horizontally movable bar 102 which serves as an armature for the solenoid windings and which is connected to one end of a lever 103 whose opposite end has a pivoted shoe 104 which straddles the central gear 39 of this three-step gear cone. Obviously, when solenoid A is energized the gear cone will be moved to its extreme righthand position, and when the solenoid C is energized this gear cone will be moved to its extreme lefthand position as the same is viewed in Fig. 13a.

To move this gear cone to its central position with the gear 39 of the cone in engagement with the gear 42 on shaft 44, as illustrated in Fig. 2, I employ in connection with the solenoid B a cam member or slide 105 which, when the solenoid B is deenergized, is in its lowermost position shown in Fig. 13a, in which case it does not interfere with the movement of the bar 102 and the lever 103 when either solenoid A or solenoid C is energized to shift the gear cone to its righthand or lefthand position. When it is desired to bring this gear cone to its middle position with gear 39 of the cone engaging gear 42 of shaft 44, this solenoid B is energized and the effect of energizing it is to shift the cam slide 105 from the dotted line position shown in Fig. 13a to the full line position shown in this same figure, resulting in the lower cam portions of the slide engaging the upper part of the lever 103 and bringing it to its central position shown in Fig. 13a. It might be here stated that the upper part of the cam slide 105 is in the form of a bar and the top and lower portions of the bar are formed of magnetic material and serve as armatures for the windings of solenoids H and B.

The solenoid H shown in Fig. 13a is employed to move the cam member 105 to the dotted line or inactive position and it will perform this function when this solenoid is energized and solenoid B is deenergized. Normally, solenoid H is energized, as will subsequently appear, and it is deenergized by means of a solenoid-type switch 106 whose winding is in series with the winding of solenoid B and will be energized so as to break the circuit and therefore deenergize solenoid H whenever the solenoid B is energized. When the winding of solenoid switch 106 is deenergized, the switch will be closed by a spring (not shown) in the well known manner.

The rear two-step gear cone is moved from its righthand to its lefthand position and vice versa by the solenoids E and D through the medium of an armature bar 107 to which is operatively connected one end of a lever 108 whose opposite end carries a pivoted shoe 109 which straddles gear 50 of this gear cone. In a similar manner, the front two-step gear cone is moved to its righthand and lefthand positions by the two solenoids F and G through the medium of an armature bar 110 which is operatively connected to one end of a lever 111 whose other end carries a pivoted shoe 112 which straddles the gear 51 of this gear cone.

It will be seen that by energizing three solenoids one of which is associated with each gear cone, the three cones will be shifted to impart a predetermined rate of movement to the work spindle. Likewise, it will be seen that by selectively energizing groups of three solenoids any of the twelve rates of movement capable of being given to the work spindle by the transmission herein illustrated can be obtained. For example, solenoid B associated with the three-step gear cone, solenoid D associated with the rear two-step gear cone, and solenoid F associated with the front two-step gear cone will shift the gear cones to the positions shown in Figs. 2 and 13a and will impart the maximum rate of movement permitted by the transmission herein illustrated.

A complete tabulation of the combinations of solenoids which are actuated for the different rates of movement, beginning with the highest rate, is as follows: B, D, F; A, D, F; C, D, F; B, E, F; A, E, F; C, E, F; B, D, G; A, D, G; C, D, G; B, E, G; A, E, G; and C, E, G.

In the preceding part of the description I have referred to the primary switch 71 shown in Figs. 4 and 7 which switch brings about the energization of the selected solenoids near the end of the downward movement of the control lever 55. Also I have referred to the step-by-step or secondary switch 86. I will next describe and explain the function and operation of manually operated solenoid selecting switches which are preferably in the form of push button switches although they may assume other forms. For convenience, they will be referred to as push button switches.

For this purpose I employ a group of these push button switches for each step of the work cycle, and in this instance six groups, and I employ in each group a separate push button switch for each different rate of movement of the work spindle, in this case twelve. In other words, in this instance six groups of twelve push button switches each are employed, making a total of seventy-two push button switches. These push button switches are preferably mounted in horizontal and vertical rows, as best shown in Fig. 14, on a switch panel 113 which may be supported on the front of the cover of the headstock so that they can be conveniently seen and operated by the operator standing in front of the machine. Although the selecting or preselecting switches constituting each group of switches have been shown in the form of single throw push button or plug switches having one operative closed position and each correlated to a different rate of movement of the movable part, an equivalent arrangement may be used employing multiple contact switch means having a plurality of operative closed positions with each closed position correlated to a different rate of movement for the movable part. The term "separate electric switches" will be employed in the claims with this sense in mind. Each of these push button switches includes a plunger 114 with a button 115 at its outer end or at the front of the panel, note particularly Fig. 15. Each of these switches is movable manually inward and is restored to its outermost position in a manner hereinafter described. In this instance, the push button switches are normally held in their outermost positions by spring detents 116 engaging grooves 117 provided near the inner ends of the plungers.

By reference to Figs. 13, 13a, 14, and 15 it will be seen that with each of the six push buttons for each rate of movement for the six different steps of the work cycle (i. e., for each vertical row of push buttons as viewed in Fig. 13) there is employed a series of contacts consisting of three superimposed unbroken contact strips 118 which are insulated from each other and from the panel. Likewise there are associated with each vertical row or group of push button switches and with the contact strips 118 six groups of relatively short contact strips 119 which are insulated from each other and from the panel, there being a series of these relatively short contact strips individual to each push button, as clearly illustrated in Fig. 13.

The number of superimposed relatively long or unbroken contact strips 118 and the number of superimposed relatively short contact strips 119 in each group will depend upon the number of shiftable members, in this instance gear cones, of the transmission. In this case I have illustrated a transmission having three such shiftable members in the form of gear cones and therefore there are three of the superimposed contacts 118 and three of the relatively short superimposed contacts 119 in each of the several groups for each of the several vertical rows of push buttons. Should the transmission employ a different number of gear cones or equivalent shiftable members, there would be a correspondingly different number of these contacts.

By reference to Fig. 13 it will be seen that the contacts for each vertical row of push buttons are identical and therefore the description of the contacts of one group or for one rate of movement will suffice for all of them. The push button switches of each vertical group or row function in connection with the superimposed contacts of each row in the following manner:

It will be noted particularly by reference to Fig. 15 that each push button plunger 114 has three spaced contact rings 120 thereon. These rings are insulated from each other and from the plunger and button should the latter be formed of metal, but preferably they are formed of insulating material. By reference to Figs. 13 and 15 it will be seen that each push button plunger enters into a series of substantially semi-circular openings formed in the superimposed relatively long contact strips 118 and the associated superimposed relatively short contact strips 119, and a stepped arrangement is provided for the rings 120 and for the inner walls of the openings which are formed in these contact strips so that when the push button has been moved inwardly, as viewed at the righthand end of Fig. 15, the outermost ring will electrically connect the outermost contact strip 118 with the outermost contact strip 119. The second ring will electrically connect the intermediate contact strips, and the innermost ring will electrically connect the innermost contact strips. This arrangement is the same for all the different push button switches.

It might be stated at this point, before describing the electrical circuits, that the plungers of the different push button switches are restored by manually operated mechanism including a series of "restore" push buttons 121, one for each horizontal row of push button switches, these being preferably arranged as shown in Fig. 14 in a separate row at one end of the series of push button switches on the panel 113 near the lefthand end thereof. The legend "restore" appearing on the panel above the vertical row of these "restore" buttons is for the convenience of the operator so as to avoid the likelihood of confusion with the buttons of the push button switches. For each horizontal row of push button switches there is a cam slide 122 which is slidably mounted at the rear part of the panel 113, this cam slide being normally urged to its lefthand position, as shown in Fig. 15, by a spring 123. The cam slide 122 has a series of teeth-like cam portions 124 which are so arranged that when the cam slide is in its normal position they will not interfere with the inward movement of the plungers of the push button switches, as clearly indicated at the righthand end of Fig. 15. The push button plungers of each horizontal row are restored by movement of the cam slide 122 in a righthand direction, as indicated in Fig. 15, and this is accomplished by the cam portions 124 forcing the plungers of the push button switches outward to their normal outward positions. Each of the "restore" push buttons 121 is operatively connected to the associated cam slide 122, in this instance by a bell crank 125 one end of which engages behind a shoulder of the associated "restore" push button and the other end of which is connected by a pin and slot connection with the cam slide 122, as clearly shown in Fig. 15. When the cam slide 122 is moved to its former inactive position by the spring 123, the bell crank acting on the plunger of the "restore" button will move it back to its normal outward position.

Taking up next the electric circuits employed with my improved electrically controlled selecting or preselecting mechanism, it will be noted by reference to Fig. 13 that the three contacts 86b of each group of contacts of the secondary or step-by-step actuated switch 86 are connected to the three relatively short superimposed contacts 119 in one of the horizontal rows of push button switches. For example, the contacts 86b of the first group have connected to them three conductors 126, and these three conductors are connected by groups of branch conductors 127 to each of the three superimposed relatively short contacts 119 of all the twelve push button switches in the top horizontal row or for the first step of the work cycle and for all twelve different speeds. The contacts 86b of the second, third, fourth, fifth, and sixth groups have similar conductors 126 connected thereto and these are in a similar fashion connected by branch conductors 127 to the relatively short contacts 119 for the second, third, fourth, fifth, and sixth horizontal rows of push button switches, i. e., for the second, third, fourth, fifth, and sixth steps of the work cycle and for all the twelve different speeds. It might be stated in explanation of the conductors illustrated in Fig. 13 that all of the conductors 126 are illustrated in full and the branch conductors 127 for the contacts 119 of the first and second steps of the work cycle are illustrated in full. The branch conductors 127 for the third, fourth, fifth, and sixth steps of the cycle are in part broken away for the first eleven speeds but are shown in full for the twelfth speed. This is done simply for the sake of clearness.

Referring now to Figs. 13 and 13a, it will be seen that the relatively long superimposed groups of contact strips 118 are connected to different groups of solenoids in accordance with the groupings heretofore given for each of the different rates of movement of the work spindle.

In Fig. 15 one of the push buttons 115 for the highest rate of movement is shown in contacting relation with the three superimposed relatively long contact strips 118 and one of the groups of superimposed relatively short contacts 119. Therefore the circuit connections will be traced out beginning with the highest rate of movement or 658 R. P. M.

It will be noted that the uppermost contact strip 118 for the highest rate of movement is connected by conductor 128 and conductor 129 to the winding of solenoid switch 106 and to one terminal of the winding of solenoid B (see Fig. 13a). The other terminal of this winding is connected by conductors 130, 131, 140, and 132 through the contacts of switch 71 to the negative terminal 75 of the supply circuit composed of the conductors 74 and 75 shown in Fig. 13. The second contact strip of this group is connected by conductor 133 to one terminal of the winding of solenoid D, the other terminal of which is connected by conductors 134, 135, 136, and 137 to conductors 131, 140, and 132, and thence to the negative conductor of the supply circuit. The lowermost contact strip 118 of this group is connected by conductors 138 and 139 to one terminal of the winding of solenoid F and the other terminal is connected by conductor 140 to conductor 132 and thence to the negative conductor 75 of the supply circuit. Thus when the circuits are energized by the closure of the main switch, as will be presently explained, the solenoids B, D, and F will be energized to impart the highest rate of movement to the work spindle, in this instance 658 R. P. M.

Taking up now the circuit connections for the solenoids for the next lower rate of movement, i. e., 475 R. P. M. of the work spindle, it will be noted that the uppermost contact strip 118 of this vertical row of push button switches is connected by conductors 141, 155, and 142 to one terminal of the winding of solenoid A the other terminal of which is connected to conductor 136 and by conductor 137 to conductors 131, 140, and 132, and thence to the negative conductor 75 of the supply circuit. The second contact strip 118 of this group is connected by conductor 143 and conductor 133 to one terminal of the winding of solenoid D the other terminal of which is connected by conductors 135, 136, 137, 131, 140, and 132 to the negative conductor 75 of the supply circuit. The lowermost contact strip 118 of this group is connected by conductors 144, 145, and 139 to one terminal of the winding of the solenoid F the other terminal of which is connected by conductors 140 and 132 to the negative conductor 75 of the supply circuit. Thus when any push button for the 475 R. P. M. rate of movement of the work spindle is pushed in, the solenoids A, D and F will be energized, resulting in obtaining the second highest rate for the work spindle.

The uppermost contact strip 118 for the third highest rate of movement of the work spindle, in this instance 364 R. P. M., is connected by conductors 146 and 147 to one terminal of the winding of solenoid C, the other terminal of the winding being connected by conductors 137, 131, 140, and 132 to the negative conductor 75 of the supply circuit. The middle contact strip 118 of this group is connected by conductor 148 and conductor 133 to one terminal of the winding of solenoid D the other terminal of which is connected by conductors 134, 135, 136, 137, 131, 140, and 132 to the negative conductor 75 of the supply circuit. The lowermost contact strip 118 of this group is connected by conductors 149, 145, and 139 to one terminal of the winding of solenoid F the other terminal of which is connected by conductors 140 and 132 to the negative conductor 75 of the supply circuit. Thus when any push button switch is actuated for the 364 R. P. M. rate for the work spindle, the solenoids C, D, and F will be energized.

The uppermost contact strip 118 for the next lower rate of movement, in this instance 274 R. P. M., is connected by conductor 150 and conductor 129 through the winding of solenoid switch 106 to one terminal of the winding of solenoid B the other terminal of which is connected by conductors previously referred to to the negative conductor 75 of the supply circuit. The middle contact of this group is connected by conductors 151 and 152 to one terminal of the winding of solenoid E the other terminal of which is connected by the conductors previously described to the negative conductor 75 of the supply circuit. The lowermost contact strip of this group is connected by conductors 153, 145, and 139 to one terminal of the winding of solenoid F the other terminal of which is connected by conductors previously described to the negative conductor 75 of the supply circuit. Thus when any push button of the group for the 274 R. P. M. rate of the work spindle is pushed in, solenoids B, E, and F will be energized.

The uppermost contact strip 118 for imparting 198 R. P. M. to the work spindle is connected by conductors 154, 155, and 142 to one terminal of the winding of solenoid A the other terminal of which is connected by conductors previously described to the negative conductor 75 of the supply circuit. The middle contact strip 118 of this group is connected by conductor 156 and conductor 152 to one terminal of the winding of solenoid E the other terminal of which is connected by conductors previously described to the negative conductor 75 of the supply circuit. The lowermost contact strip of this group is connected by conductors 157, 145, and 139 to one terminal of the winding of solenoid F the other terminal of which is connected to the negative terminal 75 of the supply circuit, as previously described. Thus when any of the push buttons in the vertical row for the 198 R. P. M. is pushed in the solenoids A, E, and F will be energized.

The uppermost contact strip 118 for the vertical row of push button switches for imparting 151 R. P. M. to the work spindle is connected by conductors 158, 159, and 147 to one terminal of the winding of solenoid C the other terminal of which is connected by conductors previously described to the negative conductor 75 of the supply circuit. The middle contact of this group is connected by conductors 160, 161, and 152 to one terminal of the winding of solenoid E the other terminal of which is connected by conductors previously described to the negative conductor 75 of the supply circuit. The lowermost contact strip 118 of this group is connected by conductors 162, 145, and 139 to one terminal of the winding of solenoid F the other terminal of which is connected by conductors previously described to the negative conductor 75 of the supply circuit. Thus when any push button in the vertical row corresponding to the 151 R. P. M. rate of movement of the work spindle is pushed in, the solenoids C, E, and F will be energized.

The uppermost contact 118 for the row of push buttons for imparting 112 R. P. M. to the work spindle is connected by conductor 163, conductor 164, and conductor 129 through solenoid switch 106 to one terminal of the winding of solenoid B the other terminal of which is connected by conductors previously described to the negative conductor 75 of the supply circuit. The middle contact 118 of this group is connected by conductors 165 and 133 to one terminal of the winding of solenoid D the other terminal of which is connected by conductors previously described to the negative conductor 75 of the supply circuit. The lowermost contact of this group is connected by conductors 166 and 167 to one terminal of the winding of solenoid G the other terminal of which is connected to conductor 131 which in turn is connected by conductors previously described to the negative conductor 75 of the supply circuit. Thus when any push button in the vertical group for the 112 R. P. M. rate of the work spindle is pushed in, the solenoids B, D, and G will be energized.

The upper contact strip 118 for the push buttons for imparting 81 R. P. M. to the work spindle is connected by conductors 168, 155, and 142 to one terminal of the winding of solenoid A the other terminal of which is connected by conductors previously described to the negative conductor 75 of the supply circuit. The middle contact strip of this group is connected by conductors 169 and 133 to one terminal of the winding of solenoid D the other terminal of which is connected by conductors previously described to the negative conductor 75 of the supply circuit. The lowermost contact strip of this group is connected by conductors 170 and 167 to one terminal of the winding of the solenoid G the other terminal of which is connected by conductors previously described to the negative conductor 75 of the supply circuit. Thus when any push button in the vertical row for imparting 81 R. P. M. to the work spindle is pushed in, the solenoids A, D, and G will be energized.

The uppermost contact strip 118 for the group of push buttons for imparting 62 R. P. M. to the work spindle is connected by conductors 171, 159, and 147 to one terminal of the winding of solenoid C the other terminal of which is connected by conductors already described to the negative conductor 75 of the supply circuit. The middle contact strip 118 of this group is connected by conductors 172 and 133 to one terminal of the winding of solenoid D the other terminal of which is connected by conductors previously described to the negative conductor 75 of the supply circuit. The lowermost contact strip 118 of this group is connected by conductors 173 and 167 to one terminal of the winding of solenoid G the other terminal of which is connected by conductors already described to the negative conductor 75 of the supply circuit. Thus when any push button in the vertical row of buttons for imparting 62 R. P. M. to the work spindle is pushed in, the solenoids C, D, and G will be energized.

The uppermost contact strip 118 for the push buttons for imparting 47 R. P. M. to the work spindle is connected by conductors 174, 164, and 129 through the winding of solenoid switch 106 to one terminal of the winding of solenoid B the other terminal of which is connected by conductors already described to the negative conductor 75 of the supply circuit. The middle strip 118 of this group is connected by conductors 175, 161, and 152 to one terminal of the winding of solenoid E the other terminal of which is connected by conductors previously described to the negative conductor 75 of the supply circuit. The lowermost contact strip of this group is connected by conductors 176 and 167 to one terminal of the winding of solenoid G the other terminal of which is connected by conductors already described to the negative conductor 75 of the supply circuit. Thus when any push button of the vertical row of push button switches for imparting 47 R. P. M. to the work spindle is pushed in, the solenoids B, E, and G are energized.

The upper contact strip 118 for the vertical row of push buttons for imparting 34 R. P. M. to the work spindle is connected by conductors 177, 155, and 142 to one terminal of the solenoid A the other terminal of which is connected by conductors previously described to the negative conductor 75 of the supply circuit. The middle contact strip of this group is connected by conductors 178, 161, and 152 to one terminal of the winding of solenoid E the other terminal of which is connected by conductors already described to the negative conductor 75 of the supply circuit. The lowermost contact strip of this group is connected by conductors 179 and 167 to one terminal of the winding of solenoid G the other terminal of which is connected by conductors previously described to the negative terminal 75 of the supply circuit. Thus when any push button in the vertical row of push button switches for imparting 34 R. P. M. to the work spindle is pushed in, solenoids A, E, and G will be energized.

The upper contact strip 118 for the vertical row of push buttons for imparting the lowest rate of movement to the work spindle, in this instance 26 R. P. M., is connected by conductors 180, 159, and 147 to one terminal of the winding of solenoid C the other terminal of which is connected by conductors already described to the negative conductor 75 of the supply circuit. The middle strip 118 of this group is connected by conductors 181, 161, and 152 to one terminal of the winding of solenoid E the other terminal of which is connected by conductors already described to the negative conductor 75 of the supply circuit. The lowermost contact strip of this group is connected by conductors 182 and 167 to one terminal of the winding of solenoid G the other terminal of which is connected by conductors previously described to the negative conductor 75 of the supply circuit. Thus when any push button of the vertical row of push buttons for imparting the lowest rate of movement to the work spindle, in this instance 26 R. P. M., is pushed in, the solenoids C, E, and G will be energized.

It might be stated at this point that for each of three successive rates of movement the same two solenoids are employed, the third solenoid only being changed. This means of course that in going from one to each of the next two succeeding rates of movement the two solenoids for each rate which were used in the preceding rate although energized, do not function since the corresponding gear cones are already in the correct positions.

Above I have described the connections between the groups of contacts 86b of the secondary or step-by-step actuated switch 86 with the relatively short contact strips 119 and also the connections between the superimposed relatively long contact strips 118 with the different solenoids and have described how the various groups of solenoids will be energized on the manipulation of the push button switches. It will be understood, of course, that the push button switches will not be rendered effective for this purpose except on the closure of the primary switch 71 to contacts of which the conductors 74 and 75 of the main current supply circuit are connected. As before stated, the positive side or conductor 74 of the supply circuit is connected (when the primary switch is closed) by way of conductor 87 to the contact strip 86a of the secondary switch 86, and it is also connected when the primary switch is closed by conductors 183 and 184 (see Figs. 13 and 13a) to one terminal of the winding of solenoid H the other terminal of which is connected by a conductor 185 to one terminal of the solenoid switch 106 the other terminal of which switch is connected through conductor 132 to the negative conductor 75 of the supply circuit when the primary switch is closed.

Having described the construction of my improved selecting or preselecting mechanism and having described the electrical circuits from one current supply conductor through the primary switch, the secondary switch, the push button switches, and the solenoids, and back to the other conductor of the supply circuit, I will now briefly describe the mode of operation of my mechanism.

Let it be assumed that the bridging contact 86c of the secondary switch 86 stands as in Fig. 6 in engagement with the last group of contacts 86b and that the shoulder 101 of the sleeve or nut 96 is set for a six-step work cycle. The operator will push in the push buttons corresponding to the desired rates of movement for all six steps of the cycle, and will then move the control lever downward from the full line position to the dotted line position shown in Fig. 3, thus causing in the first part of this movement the endwise movement of the bar 69 which will rotate the ratchet sufficiently to cause the lug 95 of the sleeve 85 by its engagement with the shoulder 101 of the sleeve or nut 96 to move the rod 92 inwardly sufficiently to spread the pawls 79 and 81, as shown in Fig. 12, whereupon the rat trap spring will rotate the shaft 78 and thus restore the sleeve 84 and the movable contact of the secondary switch 86 to the position shown in Fig. 5. During the last portion of this downward movement of the control lever the primary switch 71 will be closed by moving the bridging contacts 72 from the position shown in Fig. 4 to the position shown in Fig. 7, and the current will pass through the secondary switch through the proper group of contacts relating to the first step of the work cycle and through the proper solenoids to impart to the work spindle the selected or preselected rate of movement for the first step. Next the control lever is moved upward to its full line position to restore the pawls 79 and 81 to the position shown in Fig. 10, and next the operator will move the control lever horizontally from its central or neutral position to the dotted line position designated F in Fig. 4, and this will shift the yoke 65 to move the clutch member 29 into engagement with the clutch member 30, thus causing the spindle to be rotated at the desired speed in a forward direction.

After the first step of the work cycle has been completed the operator will again restore the control lever to its neutral position and will then depress the lever to its lowermost position and in the early part of this downward movement the movable contact of the secondary switch 86 will be shifted onto the group of contacts 86b for the second step of the cycle. Then the further downward movement of the control lever will close the primary switch whereupon the selected solenoids for the second step of the cycle will be energized, depending of course upon which particular button in the row corresponding to the second step of the cycle was pushed in.

Then the operator elevates the control lever and again moves it to engage the clutch for the forward rotation at the rate of movement selected for the second step. This will be repeated for each step of the work cycle until the work piece is completed.

Assuming that the operator intends to machine a series of pieces similar to the one just referred to, the push buttons previously pushed in need not be disturbed since they are all set for a repetition of the operations described above. However, if a different type or kind of work piece is to be machined, the operator will push the necessary "restore" buttons and bring the buttons previously pushed in to their outermost positions. He will now determine the number of steps for the new work piece and the rates of movement for these steps, and will again set the necessary push buttons for the desired rates of movement, and he will adjust the sleeve or nut 96 for the desired number of steps assuming that the number of steps is different from the number utilized in machining the previous work piece, it being remembered that the rotation of the knob 93 will enable the operator to adjust the sleeve or nut 96 for any number of operative steps.

It might be stated that, if at any time the operator finds it necessary after one or more steps of the work cycle have been completed to start the cycle anew either on the same or a different work piece, all that it will be necessary for him to do is to push in the knob 93 and while holding the knob in pull down the lever 55, whereby the movable contact of the secondary switch will be restored to its first position, and then by the downward movement of the control lever the primary switch will be closed and the machine will be in the first step of the cycle.

As previously stated, the selecting mechanism can be used in different ways. For example, instead of pushing in all the buttons corresponding to the desired rates of movement for a given work cycle before the operator initiates the first step of the cycle, the operator may push in only the button corresponding to the desired rate for the first step, and while that step is being carried out or after its completion he can push in the button corresponding to the rate of movement for the second step, and so on for all the steps of the cycle. In other words, the mechanism can be employed either as a preselecting mechanism or simply as a selecting mechanism, as already mentioned in the preceding part of the specification.

There may be occasions where the operator may desire to operate the machine and completely machine a single work piece by utilizing only one group or row of buttons 115 as, for example, the row of buttons 115 located at the right of step 1, as indicated in Fig. 14. In operating the machine in this manner the operator may, for example, first press in the button for a spindle speed of 112 R. P. M. and then move the main control lever 55 from its uppermost position vertically downwardly to its lowermost position to engage the main switch 71. During this downward movement of the control lever the operator may hold the knob 93 pressed inwardly to spread the pawls 79 and 81, see Fig. 12, to cause the step by step switch to be inoperative.

When the main control lever has reached its downward position and the main switch 71 is closed the gear cones are shifted by the proper solenoids to enable a spindle speed of 112 R. P. M. to be imparted to the spindle. After the downward movement of the main control lever the operator moves said lever upwardly and then horizontally to engage the main driving clutch and effect the rotation of the spindle at the desired speed of 112 R. P. M. The operator may leave the button 115 of the one group of buttons and corresponding to a spindle speed of 112 R. P. M. pressed inwardly until the particular machining operation on the work piece at this speed is completed.

The operator upon the completion of the first operation at a spindle speed of 112 R. P. M. moves the main control lever horizontally to disengage the main driving clutch and stop the rotation of the spindle. He then presses the restore button 121 inwardly to restore the button 115 of the first group of buttons for the spindle speed of 112 R. P. M. to its original position. After this he presses inwardly the proper button of the first group of buttons for the desired spindle speed in the next operation as, for example, the button for a spindle speed of 198 R. P. M. Then he moves the main control lever downwardly at the same time holding the knob 93 to render the step by step switch inoperative. As soon as the control lever 55 reaches its lowermost position the main switch 71 is closed and the solenoids shift the proper gear cones in the correct way to effect a spindle speed of 198 R. P. M. The operator moves the lever vertically upwardly and then horizontally to engage the main driving clutch, whereupon the machine is operating and the spindle is rotating at a spindle speed of 198 R. P. M. The operator can perform upon the work piece the different successive machining operations which he desires in the same manner by selecting merely the proper button 115 of the first group or row of buttons for the different spindle speeds required for each of the successive machining operations.

It will be understood that should the operator desire to operate the machine in the manner just explained by preselecting the different spindle speeds for the different machining operations rather than selecting the same as described, that he will then press the restore button 121 while the machine is performing one machining operation to restore the button 115 which was previously pressed inwardly, after which the operator will preselect by pressing inwardly another button 115 of the first group of buttons for the spindle speed desired for the next machining operation. The machine may be operated in this preselected manner, as it will be remembered that the main control switch 71 is not closed and the solenoids energized until the main control lever 55 has been moved vertically downwardly to its lowermost position.

It might be stated in conclusion that one factor in the simplicity of construction and operation of this mechanism is the fact that the mechanism is operated through the instrumentality of a single control lever on the headstock which controls not only the forward rotation but also the reverse rotation of the work spindle or other movable part of a machine tool, and also initiates the change in rate of movement of the work spindle after the completion of each step of the work cycle.

Thus it will be seen that the objects of the invention are attained very effectively by the construction herein illustrated, but it is to be understood that I do not desire to be confined to the precise details or arrangements shown but aim in my claims to cover all modifications which do not involve a departure from the spirit and the scope of the invention.

Having thus described my invention, I claim:

1. In a machine tool, a movable part, transmission mechanism for giving said part various rates of movement, electrical means for controlling said mechanism to select or preselect the rate of movement of said movable part for each of the different steps of the operating cycle of the machine tool, said electrical means including a plurality of motive devices for actuating the different shiftable elements of said transmission mechanism to obtain the different rates of movement and interconnected switching means for energizing said motive devices in various combinations and including a plurality of manually operable selecting switches, step-by-step actuated switch mechanism and a main switch, said manually operable selecting switches including a manually movable member for each of the different steps of the work cycle and for each of the different rates of movement and a plurality of contacts associated with each of said manually movable members, there being the same number of said contacts as there are shiftable elements, and said step-by-step switch mechanism including a plurality of groups of stationary contacts and a step-by-step movable switch contact adapted to successively cooperate with the contacts of the different groups, there being as many contacts in each group as there are shiftable elements.

2. In a machine tool, a movable part, transmission mechanism for giving said part various rates of movement, electrical means for controlling said mechanism to select or preselect the rate of movement of said movable part for each of the different steps of the operating cycle of the machine tool, said electrical means including a plurality of motive devices for actuating different shiftable elements of said transmission mechanism to obtain the different rates of movement and interconnected switching means for energizing said motive devices in various combinations and including a plurality of manually operable selecting switches, step-by-step actuated switch mechanism and a main switch, said manually operable selecting switches each including a manually movable member for each of the different steps of the work cycle and for each of the different rates of movement and a plurality of contacts associated with said manually movable member, there being the same number of said contacts as there are shiftable elements, and said step-by-step switch mechanism including a plurality of groups of stationary contacts and a step-by-step movable switch member adapted to successively cooperate with the contacts of the different groups, there being as many contacts in each group as there are shiftable elements, a control lever, and means by which the actuation of said control lever successively moves the movable switch member of said step-by-step switch mechanism and then actuates the main switch.

3. In a machine tool having a movable part, a transmission for moving said part at various rates including an element shiftable to at least three different operative positions, electromotive means for shifting said element to two of said positions, a member operatively connected with said element for shifting it to an intermediate position, an electromotive device operatively connected to said member for shifting to and normally holding said member in an inoperative position, an electric circuit to said device including a normally closed switch, an electromotive device operatively connected to said member to shift the same to operative position to shift said element to said intermediate position, and an electric circuit to said last named electromotive device including a solenoid operatively associated with said normally closed switch whereby when said last named device is energized said solenoid opens said normally closed switch and said first named device is deenergized and said member can move to operative position.

4. In a machine tool having a movable part, a change speed transmission for moving said part at different rates including shiftable elements, electromotive devices operatively connected with said elements to shift the same; a separate electric switch for each different rate of movement of said part, electric circuits operatively connecting each of said switches with a plurality of devices for shifting all of said elements, said switches being manually operable to select the different rates of movement for said part.

5. In a machine tool having a movable part, a change speed transmission for moving said part at different rates including shiftable gear cones, solenoids operatively connected to said gear cones to shift the same; a separate electric switch for each different rate of movement of said part, electric circuits operatively connecting each of said switches with a plurality of said solenoids for shifting all of said gear cones, said switches being manually operable to select the different rates of movement for said part.

6. In a machine tool having a movable part, a change speed transmission for moving said part at different rates including shiftable elements, electromotive devices operatively connected with said elements to shift the same; a plurality of groups of separate electric switches, with the groups corresponding in number to the number of different operative steps in a complete work cycle and with the switches in each group corresponding in number to the number of different rates of movement for said part, electric circuits operatively connecting said switches and said devices, said switches in each group being manually operable to select or preselect a different rate of movement for said part, and means for successively closing the circuits between said devices and the switches which have been manually operated in each group in correlation to the operative steps of the work cycle.

7. In a machine tool having a movable part, a change speed transmission for moving said part at different rates including shiftable elements, electromotive devices operatively connected with said elements to shift the same; normally open electric circuits connected to said devices, separate electric switchs arranged in said circuits and each manually operable to select or preselect a rate of movement for said part, said switches corresponding in number to the number of different rates of movement for said part, and a master switch common to said circuits and operable to close the latter to obtain said selected or preselected different rates of movement.

8. In a machine tool having a movable part, a change speed transmission for moving said part at different rates including shiftable elements, electromotive devices operatively connected with said elements to shift the same; normally open electric circuits connected to said devices, a plurality of groups of separate electric switches arranged in said circuits and manually operable to select or preselect the different rates of movement for said part, the groups of switches corresponding in number to the number of different operative steps in a complete work cycle, a master switch common to said circuits and operable to close the latter to obtain the different rates of movement for said part in each of said operative steps.

9. In a machine tool having a movable part, a change speed transmission for moving said part at different rates including shiftable elements, electromotive devices operatively connected with said elements to shift the same; normally open electric circuits connected to said devices, a plurality of groups of separate electric switches, with the groups corresponding in number to the number of different operative steps in a complete work cycle and with the switches in each group corresponding in number to the number of different rates of movement for said part, said switches in each group being manually operable to select or preselect a different rate of movement for said part, a step by step movable switch for placing the different groups of separate switches successively in said circuits in correlation to the operative steps of the work cycle, and a master switch common to said circuits and operable to close the latter to obtain the said selected or preselected different rates of movement.

10. In a machine tool having a movable part, a change speed transmission for moving said part at different rates including shiftable elements, a power source, means for connecting and disconnecting said power source to and from said transmission, a control member for said means, electromotive devices operatively connected with said elements to shift the same; normally open electric circuits connected to said devices, a plurality of groups of separate electric switches, with the groups corresponding in number to the number of different operative steps in a complete work cycle and with the switches in each group corresponding in number to the number of different rates of movement for said part, said switches in each group being manually operable to select or preselect a different rate of movement for said part, a step by step movable switch for placing the different groups of separate switches one group at a time in said circuits in correlation to the operative steps of the work cycle, a master switch common to said circuits and operable to close the latter to obtain the said selected or preselected different rates of movement, and operative connections between said master switch and said control member.

11. In a machine tool having a movable part, a change speed transmission for moving said part at different rates including shiftable elements, a power source, means for connecting and disconnecting said power source to and from said transmission, a control member for said means, electromotive devices operatively connected with said elements to shift the same; normally open electric circuits connected to said devices, a plurality of groups of separate electric switches, with the groups corresponding in number to the number of different operative steps in a complete work cycle and with the switches in each group corresponding in number to the number of different rates of movement for said part, said switches in each group being manually operable to select or preselect a different rate of movement for said part, a step by step movable switch for placing the different groups of separate switches one group at a time in said circuits in correlation to the operative steps of the work cycle, a master switch common to said circuits and operable to close the latter to obtain the said selected or preselected different rates of movement, and operative connections between said control member and said step by step movable switch and said master switch whereby said control member actuates the two latter switches.

12. In a machine tool having a movable part, a change speed transmission for moving said part at different rates including shiftable elements, a power source, means for connecting and disconnecting said power source to and from said transmission, a control member for said means, electromotive devices operatively connected with said elements to shift the same; normally open electric circuits connected to said devices, a plurality of groups of separate electric switches, with the groups corresponding in number to the number of different operative steps in a complete work cycle and with the switches in each group corresponding in number to the number of different rates of movement for said part, said switches in each group being manually operable to select or preselect a different rate of movement for said part, a step by step movable switch for placing the different groups of separate switches one group at a time in said circuits in correlation to the operative steps of the work cycle, a master switch common to said circuits and operable to close the latter to obtain the said selected or preselected different rates of movement, and operative connections between said control member and said step by step movable switch and said master switch such that movement of said control member first actuates said step by step movable switch and then closes said master switch.

13. In a machine tool having a movable part, a change speed transmission for moving said part at different rates including shiftable elements, a plurality of individual electromotive devices operatively connected with each of said elements to shift the same; a plurality of manually operable electric switches, and electric circuits interconnecting said switches and said devices, said circuits being such that each switch is interconnected with at least one of the devices for shifting each of said elements whereby actuation of any one of said switches effects shifting of all of said elements.

14. In a machine tool having a movable part, a change speed transmission for moving said part at different rates including shiftable elements, separate means operatively connected with each respective element for shifting the same, with each of said separate means comprising a plurality of electromotive devices, a plurality of electric switches manually operable to select or preselect the different rates of movement for said part, normally open electric circuits interconnecting each of said switches with each of said separate means, said circuits being such that every one of said switches is interconnected with at least one of the electromotive devices of each of said separate means, whereby actuation of any one of said switches effects shifting of all of said elements, and a master switch common to said circuits and operable to close the latter to obtain the said selected or preselected different rates of movement.

15. In a machine tool having a movable part, a change speed transmission for moving said part at different rates including shiftable elements, separate means operatively connected with each respective element for shifting the same, with each of said separate means comprising a plurality of electromotive devices, a plurality of electric switches manually operable to select or preselect the different rates of movement for said part, normally open electric circuits interconnecting each of said switches with each of said separate means, said circuits being such that every one of said switches is interconnected with at least one of the electromotive devices of each of said separate means whereby actuation of any one of said switches effects shifting of all of said elements, a power source, means for connecting and disconnecting said power source to and from said transmission, a control member for said latter means, a master switch common to all of said circuits and operable to close the same to obtain the said selected or preselected different rates of movement, and operative connections between said master switch and said control member.

JOHN J. N. VAN HAMERSVELD.